(12) United States Patent
Caci

(10) Patent No.: US 8,499,173 B2
(45) Date of Patent: Jul. 30, 2013

(54) APPARATUS AND METHOD FOR PROTECTION OF CIRCUIT BOARDS FROM TAMPERING

(75) Inventor: J. Claude Caci, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 233 days.

(21) Appl. No.: 12/953,002

(22) Filed: Nov. 23, 2010

(65) Prior Publication Data

US 2012/0131673 A1 May 24, 2012

(51) Int. Cl.
G06F 21/00 (2006.01)
(52) U.S. Cl.
USPC .............................. 713/194; 713/187; 726/34
(58) Field of Classification Search
USPC .............. 713/194, 193, 187, 189; 726/23–24, 726/34–36
See application file for complete search history.

(56) References Cited

U.S. PATENT DOCUMENTS

| 7,200,567 | B2 | | 4/2007 | Caci et al. | |
|---|---|---|---|---|---|
| 7,415,618 | B2 | * | 8/2008 | de Jong | 713/190 |
| 7,891,008 | B2 | * | 2/2011 | Fortune et al. | 726/27 |
| 8,281,389 | B2 | * | 10/2012 | Beaver et al. | 726/18 |
| 2003/0145215 | A1 | * | 7/2003 | Dohi | 713/193 |
| 2003/0212910 | A1 | * | 11/2003 | Rowland et al. | 713/201 |
| 2004/0123122 | A1 | * | 6/2004 | Asai et al. | 713/189 |
| 2005/0278553 | A1 | * | 12/2005 | Wu et al. | 713/194 |
| 2006/0143717 | A1 | * | 6/2006 | Ransome et al. | 726/35 |
| 2008/0010470 | A1 | * | 1/2008 | McKeon et al. | 713/194 |

* cited by examiner

*Primary Examiner* — Lisa Lewis
(74) *Attorney, Agent, or Firm* — Howard IP Law Group, P.C.

(57) ABSTRACT

A method and system for protecting a printed circuit board (PCB) from tampering positions a physical sensor proximal to the PCB. An initialization period is established and an output signal from the sensor is continuously monitored to establish threshold parameter data. Periodically, the sensor is polled and an output signal received which is compared to the threshold parameter data. A detected intrusion signal is generated if the received signal exceeds the threshold by a predetermined level. A detected intrusion is validated using a sent of validation rules which analyze the detected intrusion based on historical sensor output values and factors such as duration or frequency of intrusion detections. If the detected intrusion is validated, a validated signal is generated which triggers a reset processor to output a reset signal that causes erasure of at least a portion of onboard memory.

21 Claims, 11 Drawing Sheets

APPARATUS AND METHOD FOR PROTECTION OF CIRCUIT BOARDS FROM TAMPERING

FIELD OF THE INVENTION

This application relates to security of printed circuit boards. More particularly, this application relates to tamper detection for circuit boards.

BACKGROUND

Printed circuit boards are used to provide a medium upon which electrical and electronic circuit components are mounted and interconnected to perform circuit functions. Various components, for example, memory elements, processors, application specific integrated circuits (ASICs), field programmable gate arrays (FPGAs), or programmable logic devices (PLDs) and the like may be electrically coupled to a circuit board to perform a variety of functions.

Because the functions of circuit boards may vary, the value of a specific board may likewise vary. In a typical implementation, a computer system may comprise a backplane which provides a plurality of slots into which circuit boards may be inserted via an appropriate interface. Multiple boards may be inserted into the backplane, each circuit board performing a specific function. Through the backplane, the circuit boards are interconnected and therefore, each board's function may provide inputs to other boards. Conversely each board may receive as inputs, the output of another board. Thus, the boards inserted into the backplane may be interconnected and interoperable.

The specific function performed by a circuit board determines the components that are housed within the circuit board. For example, a board may comprise a processor and a memory containing specialized software for performing the board's designed function. Such software may be proprietary and of great value to it's owner. For example, the circuit board may contain an FPGA containing proprietary circuitry and logic designed to perform a special function having high value to its developer. Moreover, the FPGA may include software in its on-chip memory resources that contain sensitive or valuable intellectual property.

The intellectual property contained within any given circuit board may represent significant research and development and have high market value. As such, some circuit boards in a system comprising multiple boards may have extremely high values in comparison with other circuit boards in the system. High intrinsic value makes these boards targets for pirating and theft of their associated intellectual property through unauthorized access to and/or tampering with on-board devices. Systems and methods for detecting tampering of circuit boards and protecting the information contained therein, are desired.

SUMMARY

A system for protecting a circuit board such as a printed circuit board (PCB) from tampering includes a physical sensor positioned and configured to monitor a region proximal to the PCB for physical intrusion. The sensor is configured to output data indicative of potential intrusion. A processor on the circuit board is responsive to the sensor output data and operates to compare the output data from the sensor with threshold parameter data based on a baseline sensor output signal range determined during an initialization time period. The processor outputs a signal that indicates a detected intrusion if the results of the comparison exceed a predetermined level. A validation processor, upon receiving a detected intrusion signal, is configured to apply a set of validation rules to the sensor output data to determine if the detected intrusion is an actual intrusion or a false alarm. If the detected intrusion is determined to be an actual intrusion, a validation intrusion signal is generated by the validation processor. A reset processor on the circuit board receives the validated intrusion signal and provides a reset signal that causes erasure of at least a portion of memory within the PCB.

A method of protecting a PCB from tampering comprises positioning a sensor proximal to the PCB. An output signal is received from the sensor indicative of an intrusion in the region proximal to the PCB. Based on an output signal of the sensor over a predetermined initialization time period, threshold parameter data is established providing a baseline sensor output range. The sensor is periodically polled to receive an output signal from the sensor which is compared with the threshold parameter data. When the output signal from the sensor exceeds the threshold parameter data by a predetermined level, a detected intrusion signal is generated. A historical log of sensor output signals is stored in memory and used by a processor to apply a set of validation rules to analyze the stored data and validate a detected intrusion signal as an actual intrusion. A validation intrusion signal is generated if the detected intrusion is identified as an actual intrusion. A reset signal is generated based on a validated intrusion and is operative to cause a processor to erase at least a portion of memory onboard the PCB responsive to the validation intrusion signal.

In another aspect, a memory map is established, wherein the memory map associates regions of a memory to specific functions of the PCB. A hash code value is computed value based on a current state of select memory within the PCB and is stored in a memory. Periodically, the hash code value is re-computed based on a current state of the select memory within the PCB and compared with the stored hash code value. If the re-computed hash code value does not match the stored hash code value, a detected intrusion signal is generated. The detected intrusion is validated based on a set of validation rules. The validation rules validate an actual intrusion based on expected memory usage based on the memory map and a detected change in memory utilization. A validated intrusion signal is generated when a detected intrusion signal is validated as an actual intrusion.

In another embodiment of the invention, a machine-readable medium contains stored instructions, the instructions when executed by a processor cause the processor to establish threshold parameter data based on output signals received over a predetermined initialization time period from a sensor positioned proximal to a printed circuit board (PCB). The sensor is periodically polled to obtain the sensor data and compare the sensor data to the threshold parameter data. The processor generates a detected intrusion signal when the received output signal exceeds the threshold parameter data by a predetermined level. The processor stores data pertaining to a plurality of output signals in a memory and analyzes the stored data based on a set of validation rules to validate a detected intrusion signal as an actual intrusion. The processor generates a validation intrusion signal on a condition that the detected intrusion is identified as an actual intrusion, and further generates a reset signal to erase at least a portion of memory onboard the PCB based on receiving a validation intrusion signal.

DETAILED DESCRIPTION

Figure 1:
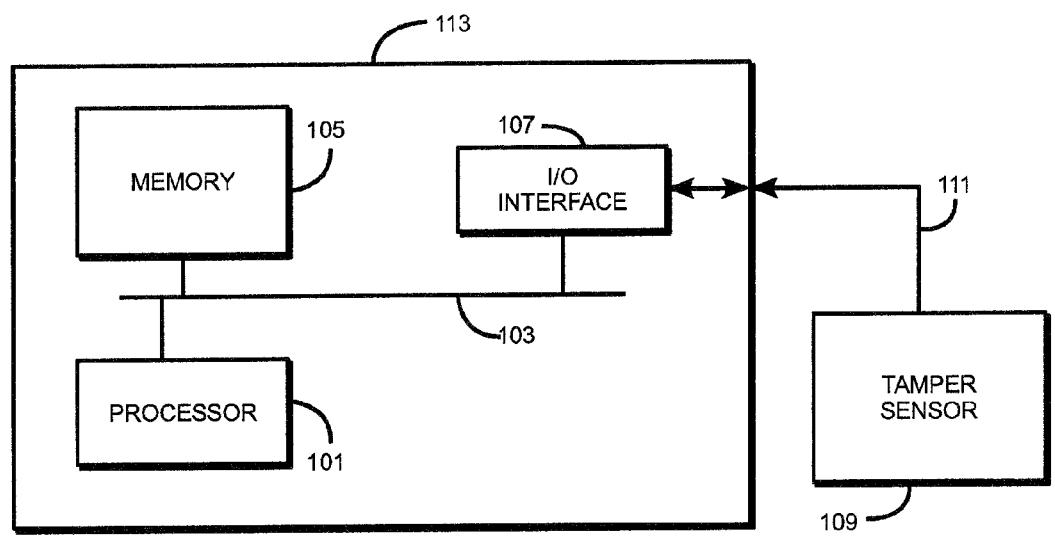
FIG. 1 is a block diagram of an anti-tamper activation system (ATAS)

FIG. 1 is a block diagram of an anti-tamper system (ATAS) 100. The anti-tamper system 100 comprises a computer 113 including a processor 101 coupled to a data bus 103. The processor 101 receives instructions and processes the instructions for the system 100. The instructions may be stored in a memory 105. The memory may be of the form of flash memory, random access memory (RAM), read-only memory (ROM), or other non-transitory machine-readable medium upon which are stored the software instructions, by way of non-limiting example. Such non-transitory machine-readable media include but are not limited to, floppy disks, CD-ROMs, Digital Versatile Disks (DVDs), Optical Disks, flash memory, or any other memory form compatible with system 100 and capable of coupling and communicating via the data bus 103. Computer 113 further comprises input/output (I/O) interface 107 for communicating data to and from the computer 113.

In the ATAS 100 of FIG. 1, at least one tamper sensor 109 communicates with I/O interface 107 of the anti-tamper system 100 through a signal communication pathway 111. The tamper sensor 109 is configured to physically monitor a circuit board and provide sensor data associated with such monitoring to the anti-tamper system 100. The processor 101 receives the monitoring data from tamper sensor 109 via data bus 103 and processes the physical monitoring data based on instructions stored in memory 105.

Figure 2:
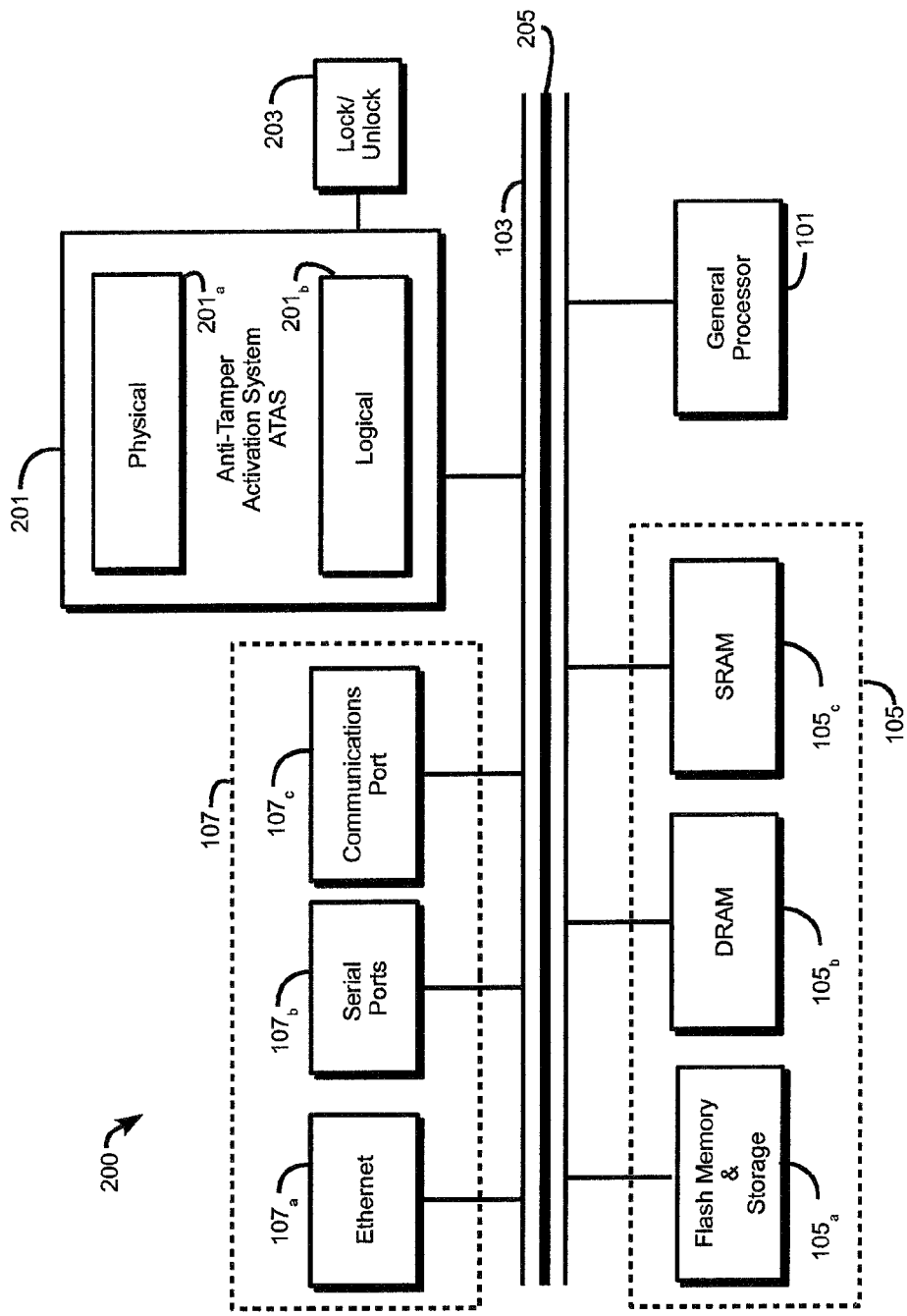
FIG. 2 is a block diagram of a circuit board including an ATAS.

FIG. 2 is a block diagram of a circuit board 200 equipped with an anti-tamper activation system (ATAS) 201. The circuit board contains components interconnected by data bus 103. Coupled to the data bus 103 is a processor 101, memory 105 and I/O interface 107. An ATAS 201 is coupled to data bus 103 providing the ATAS access to memory 105 and processor 101.

I/O interface 107 may include a network connection, such as an Ethernet connection $107_a$, a serial port $107_b$, or other suitable communications port $107_c$. Communication between the circuit board 200 and other system components, including other boards interconnected to circuit board 200 through for example, a backplane, may be performed via I/O interfaces 107.

By way of example only, memory 105 may be implemented as one of more of, flash memory $105_a$, dynamic RAM (DRAM) $105_b$, and static RAM (SRAM) 105. Memory 105 may contain system data relating to the ATAS 201, software relating to logical aspects of the ATAS as well as other operating software achieving the designed function of the circuit board 200. Memory 105 may be in the form of a non-transitory machine-readable medium upon which are stored instructions. The instructions, when executed by a processor 101, cause the processor 101 to perform steps or processes including but on limited to the functions of an ATAS 201.

The ATAS 201 provides a means of detecting and verifying unauthorized intrusions (i.e. tampering) to the circuit board. The ATAS 201 performs this function utilizing physical components designated as $201_a$ and logical components designated as $201_b$. The physical components $201_a$ of the ATAS 201 comprise an intrusion detection device or sensor assembly discussed in more detail in FIGS. 4-6. The physical intrusion detection device includes at least one tamper sensor 109 as shown in FIG. 1, which is configured to monitor the physical space proximate to the surface of the circuit board. In one embodiment, the tamper sensor is configured such that when an object enters the space above the circuit board, signals 111 are output by the tamper sensor indicative of a detected intrusion. The output signals from the sensor are received by a processor on the circuit board configured to determine whether the signals 111 are indicative of an actual (validated) intrusion, or merely an anomaly. The logical components $201_b$ of ATAS 201 may be implemented through various software modules. Each software module comprises software instructions stored in memory 105. These software modules perform, among other functions, the processing of the signals 111 received from the tamper sensor 109 to determine the nature of a detected intrusion, e.g. whether the detected intrusion is an actual intrusion or an anomaly.

It is understood that the circuit board may require periodic maintenance. A lock/unlock module 203 of the ATAS 201 provides an authorized user the ability to interface with the circuit board 200 and the ATAS 201 and to disable the physical $201_a$ and logical aspects $201_b$ of the ATAS 201. this feature provides the authorized user with access to the circuit board 200 without triggering an intrusion event. Maintenance may involve swapping components, updating or replacing memory 105, replacing or calibrating tamper sensors 109 or other routine or periodic maintenance or system upgrades. Upon completion of the maintenance activity, the authorized user re-locks (i.e. activates the ATAS 201) the circuit board 200, enabling the physical aspect $201_a$ and the logical aspect $201_b$ of the ATAS 201 and restoring anti-tamper capabilities.

As part of the anti-tamper functionality, the logical components $201_b$ of ATAS 201 may include a reset procedure which performs a reset to a memory 105 or device, for example an FPGA, and erases or otherwise destroys sensitive or valuable data contained in the circuit board 200. Upon detection and validation of an intrusion, the ATAS 201 may be configured to reset some or all of the circuit board components to protect the information associated with the circuit board 200. In the event that circuit board 200 performs a vital function within a larger system (for example, where circuit board 200 is an adaptive filtering processor for an air traffic control radar system), resetting the circuit board 200 may adversely affect the safety of people relying on the system 100. Therefore, the ATAS system may communicate a signal, for example, a signal reserved as part of a communications standard for such a purpose 205 over the communication bus 103 via communications port 207 when an intrusion is detected and validated and a circuit board reset is initiated to inform other sub-systems of the imminent shutdown of the circuit board.

Figure 3:
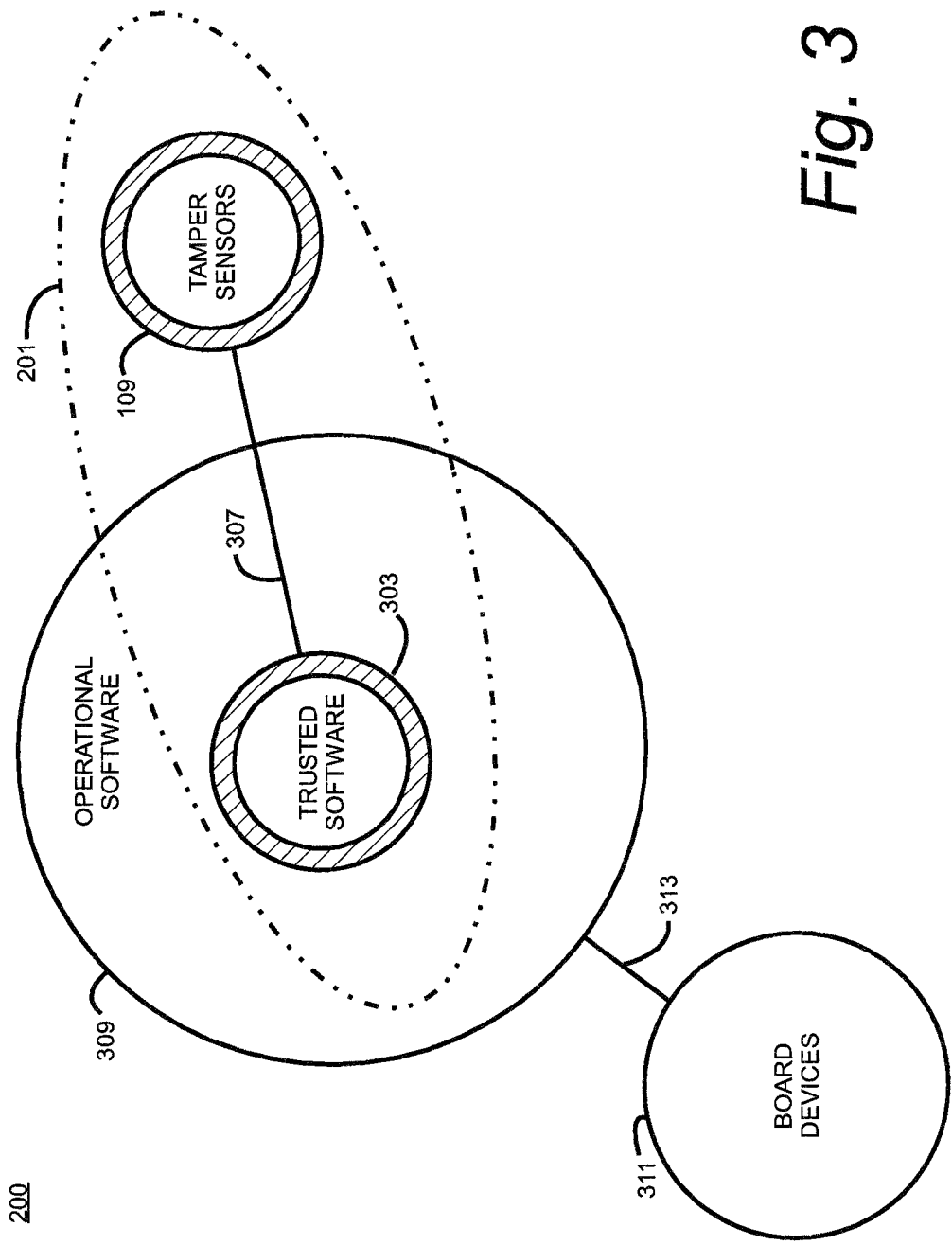
FIG. 3 is a diagram of a trusted anti-tamper activation system.

Referring to FIG. 3, a block diagram of a circuit board 200 equipped with an ATAS 201 implemented in a system utilizing trusted software 303 is shown. Circuit board 200 contains board devices 311 physically attached to the circuit board for performing the circuit board's designed functions. The board devices 311 are implemented such that data and/or control signals are received via communication link 313. Inputs for the board devices 311 may be generated by operational software 309 housed within memory (e.g. 105 of FIG. 2) on the circuit board. Operational software 309 includes software required to control the board devices 311 in addition to processing data required for the designed operation of the circuit board 200. A subset of the operational software 309 is characterized as trusted software 303. Trusted software 303 is characterized as software that is verifiable as authentic having no indications of tampering. Trusted software 303 may be encrypted, or may contain hash codes to ensure the stored software files are authentic. Trusted software 303 is in communication with tamper sensors 109 via communication link 307. Tamper sensors 109 include physical sensor devices that may be authenticated and in combination with control functions provided by the trusted software 303, create a trusted domain of the ATAS 201. For example, trusted software 303 may include one or more software modules configured to generate a pseudo-random noise (PRN) patterned clock cycle to be utilized by tamper sensor 109 which, by way of example, may be implemented as a light emitter. The tamper sensor 109 may further include one or more light receivers configured to detect the light emitted according to the PRN clock pattern. Using a PRN pattern known only to the trusted software 303 and analyzing the signals 111 from the tamper sensor 109, based on the known PRN pattern, enables authentication of the tamper sensor 109, verifying the tamper sensor 109 is operating properly and that outside influences such as tampering or spoofing of the receivers may be ruled out.

As shown, a trusted domain defined by the trusted software 303, tamper sensor 109 and communication link 307, provides the functionality of the ATAS 201. As previously discussed with respect to FIG. 2, the physical components $201_a$ of the ATAS 201 are embodied in the trusted tamper sensor 109 and the logical components $201_b$ of the ATAS 201 are embodied in the trusted software 303. The logical components $201_b$ of the ATAS 201 may comprise a plurality of software modules, each software module configured to perform a sub-function of the ATAS 201. Operation of individual software modules is described hereinafter with respect to FIG. 8.

Figure 4:
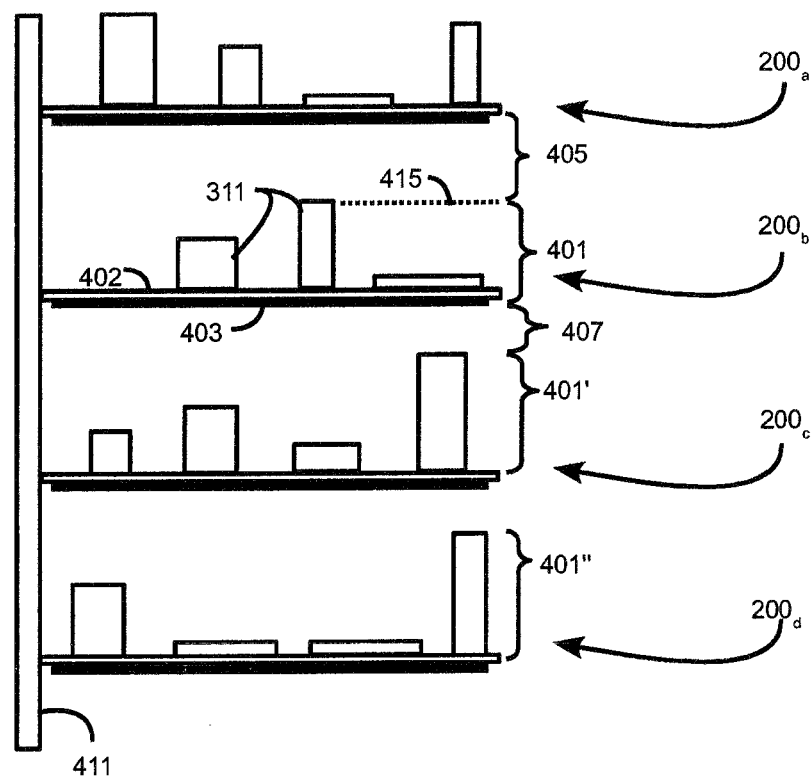
FIG. 4 is an elevation view of a backplane with circuit boards inserted and utilizing an ATAS.

Referring now to FIG. 4, there is shown an exemplary embodiment of a backplane 411 containing four circuit boards, $200_{a-d}$ inserted in the backplane 411. While the physical components of circuit board $200_b$ are described herein, other circuit boards $200_a$, $200_c$, $200_d$ possess physical characteristics and features analogous to circuit board $200_b$ and are not described in further detail for purposes of brevity. Circuit board 200 comprises a substrate 402 upon which is disposed a plurality of board devices 311. A vertical dimension 415 defined as the distance from the upper surface of the substrate 402 to the height of the tallest board device 311 is denoted as the board height 401. The board height 401 may vary from circuit board $200_a$ to circuit board $200_n$, as board height 401 depends on the height of the tallest board device 311 associated with the given circuit board 200. As shown, board height 401 is different from board heights 401' and 401" due to the height of the tallest board device 311 associated with each of circuit boards $200_b$, $200_c$ and $200_d$, respectively. Circuit board $200_b$ may also have a bottom cover 403 disposed on the bottom side of substrate 402. The bottom cover 403 prevents access via probes to terminal ends of board devices 311 that extend through the cross-sectional area of the substrate 402.

Between each circuit board 200 in the backplane 411 (for example, circuit board $200_a$ and circuit board $200_b$), an open space is defined between the height of the tallest board device 311 (vertical dimension 415) and the underside of the next adjacent circuit board $200_a$. This space is referred to as a sensor zone 405. The physical component $201_a$ of the ATAS 201 operates within the sensor zone 405. By way of example, tamper sensor 109 may be positioned proximal to the circuit board 200 to physically monitor of the area of sensor zone 405. Circuit boards 200 installed in a backplane 411, may be positioned such that there are vertically adjacent circuit boards $200_{a,c}$ both above and below a given circuit board $200_b$. For example, circuit board $200_b$ is vertically adjacent to circuit board $200_a$ above and circuit board $200_c$ below. With respect to the circuit board $200_c$ below, a corresponding sensor zone 407 is identified with respect to circuit board $200_b$. Thus, the sensor zone of circuit board $200_c$ may serve to protect the area above circuit board $200_c$, but may also be configured to monitor the space below circuit board $200_b$ and detect possible intrusions or tampering of circuit board $200_b$ from its underside.

Figure 5:
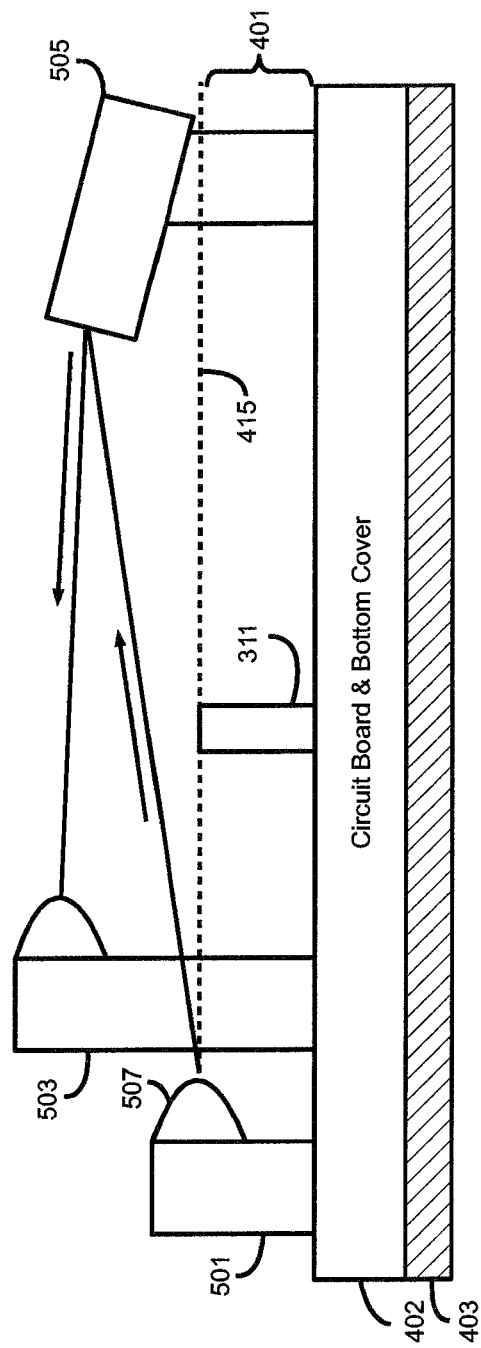
FIG. 5 is an elevation view of a circuit board and sensor assembly embodiment of an ATAS.

FIG. 5 is an elevation view of a circuit board 200 showing the physical component $201_a$ of an ATAS 201 according to an exemplary embodiment of an ATAS 201. The circuit board 200 is comprised of a substrate 402, a bottom cover 403 and board devices 311. While multiple board devices 311 may be disposed on the circuit board 200, only one board device 311 is shown in FIG. 5 to reduce the complexity of the drawing and to enable a better understanding of the physical component $201_a$ of ATAS 201. Board device 311 is the tallest component disposed on circuit board 200 and defines a vertical dimension 415 extending from the upper side of the substrate 402 to the height of the tallest board device 311. The vertical dimension 415 defines a board height 401. Above the board height 401 is a sensor zone 405 (as shown in FIG. 4). Within sensor zone 405, a tamper sensor 109 is positioned to monitor the sensor zone 405 to detect possible tampering.

In an exemplary embodiment, the tamper sensor comprises a light emitter 501, a light receiver 503 and a reflector 505. In the embodiment of FIG. 5, light emitter 501 is positioned proximal to the circuit board and emits light energy into the sensor zone 405. The light energy may be controlled by a collimating lens 507 placed over the emitting surface of light emitter 501. By controlling the power level and shape of the collimating lens 507, the light energy focused by the collimating lens 507 generates a thin plane of light energy that extends substantially to an area defined by the perimeter of circuit board 200 without extending past any edge of the circuit board 200. Light energy is reflected by reflector 505 and re-directed toward light receiver 503. During normal operation of the circuit board 200, light receiver 503 substantially continuously monitors the ambient conditions of the emitted light energy. A predetermined initialization period, defined as a fixed period of time following the power-up of the circuit board 200, or a time period triggered by the re-locking of an ATAS equipped circuit board 200 by an authorized user, may be utilized to establish a baseline measurement of ambient conditions during operation of the circuit board 200 and provide threshold parameter data. Changes in the level of light energy detected at the light receiver 503 are logged and sent as signals 111 to the logical component $201_b$ of the ATAS 201 for processing and subsequent action, such as a board reset.

As described in relation to FIG. 3, light emitter 501 and light receiver 503 coherently process light energy signals generated by a PRN clock cycle known to the ATAS 201. A clock cycle based on a PRN pattern ensures the security of the tamper sensor 109 signals 111 and provide a trusted environment for the physical component $201_a$ of the ATAS 201. Light emitter 503 is provided by way of example as an optical or electromagnetic transmitter. Light emitter 503 may be configured as one or more light emitting diodes (LEDs), lasers, or other form of optical transmitter. Alternatively, light emitter 503 may be embodied as a radio frequency (RF) transmitter that transmits an electromagnetic signal in a region proximal to the circuit board. In any case, at least one appropriately configured receiver 503 corresponding to the transmitter is provided to monitor and receive the emitted signal.

The configuration of components in FIG. 4 are provided by way of example only. Other configurations providing the functionality of a tamper sensor 109 may be contemplated by a person skilled in the art without departing from the scope of an ATAS 201 and in accordance with this specification. For example, in an alternate embodiment, the reflector 505 may be omitted. In an embodiment without a reflector 505, light receiver 503 is positioned relative to the emitter to detect reflective energy representative of an emitted light signal only when a foreign object enters the sensor zone 405 and reflects the emitted light energy back to the light receiver 503.

Figure 6:
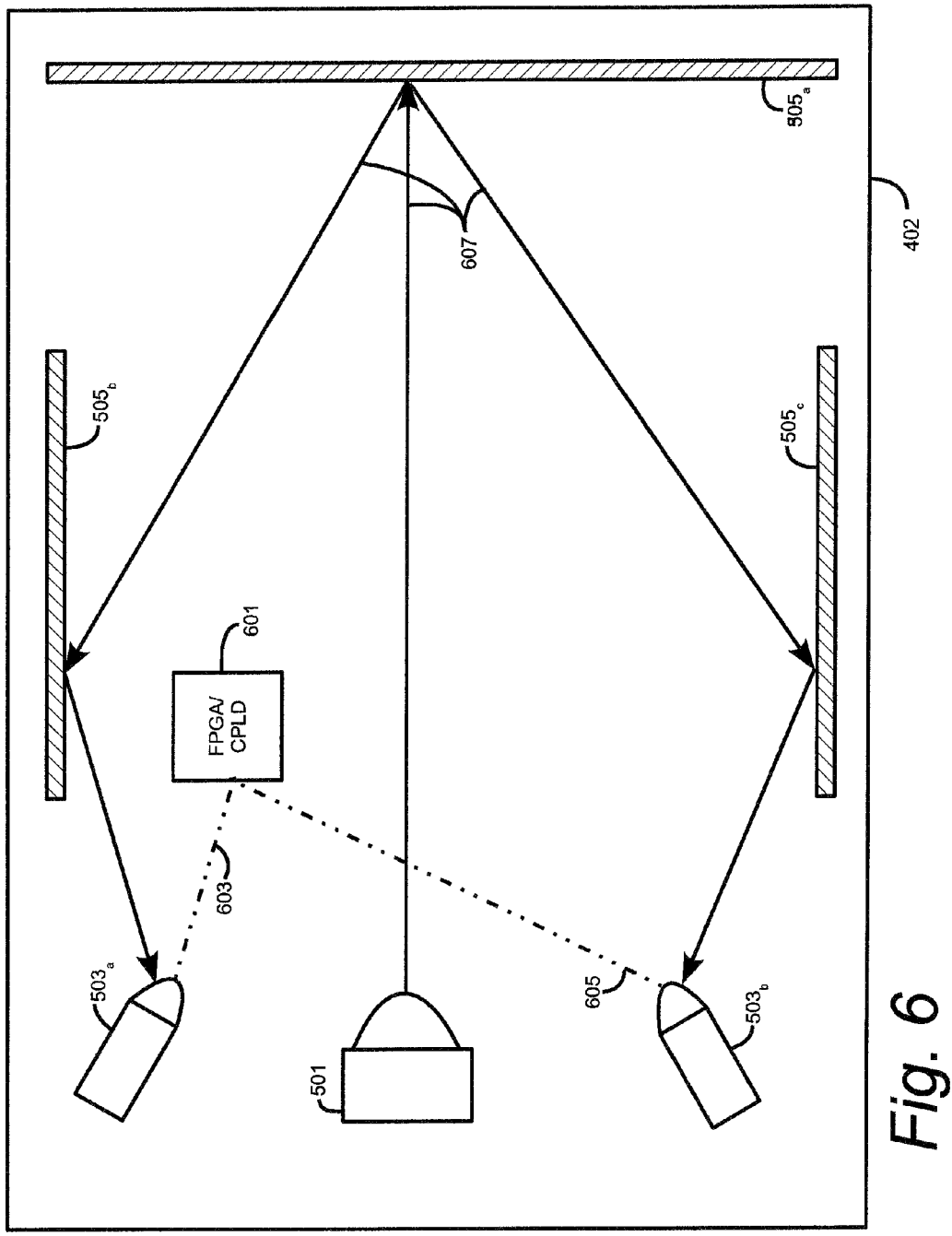
FIG. 6 is a plan view of a circuit board and sensor assembly embodiment of an ATAS.

FIG. 6 is a plan view of a circuit board 200 showing the physical component $201_a$ of an ATAS 201 in an embodiment having a single light emitter 501 and two light receivers $503_{a,b}$. As shown, three reflectors $505_{a,b,c}$ are used to direct emitted light energy through the sensor zone 405 and back to light receivers $503_{a,b}$. An FPGA 601 or complex PLD (CPLD) may be disposed on the substrate 402 of the circuit board 200 having a relative position with respect to each light receiver $503_a$ and $503_b$. The distance 603 between light receiver $503_a$ and the FPGA 601 is shorter than distance 605 between light receiver $503_b$ and FPGA 601. If an unauthorized party were to attempt to tamper or probe FPGA 601 to monitor or copy protected information within FPGA 601, a reflection off the foreign object entering sensor zone 405 generates light energy having a higher flux with respect to light receiver $503_a$ than that of light receiver $503_b$, due to light receiver $503_a$ being in closer proximity to the foreign object. A difference in reflective energy measured by each light receiver $503_{a,b}$ provides information as to the relative position on the circuit board 200 of the potential intrusion. That is, an intrusion directed toward a specific board device 311 such as FPGA 601 may be detectable and provide relevant information as to the nature and precise location of a detected intrusion such as the targeting of a particular component. For example, a high-value FPGA logic design may be a specific target of an intrusion attempt. In an exemplary embodiment, the supplemental information regarding the specific targeting of the high-value FPGA may be used to prioritize the order in which specific elements such as FPGAs or memory elements are selected for erasure or reset based on the relative value of such elements. This provides the owner with the ability to more rigorously protect certain types of intellectual property.

Figure 7A:
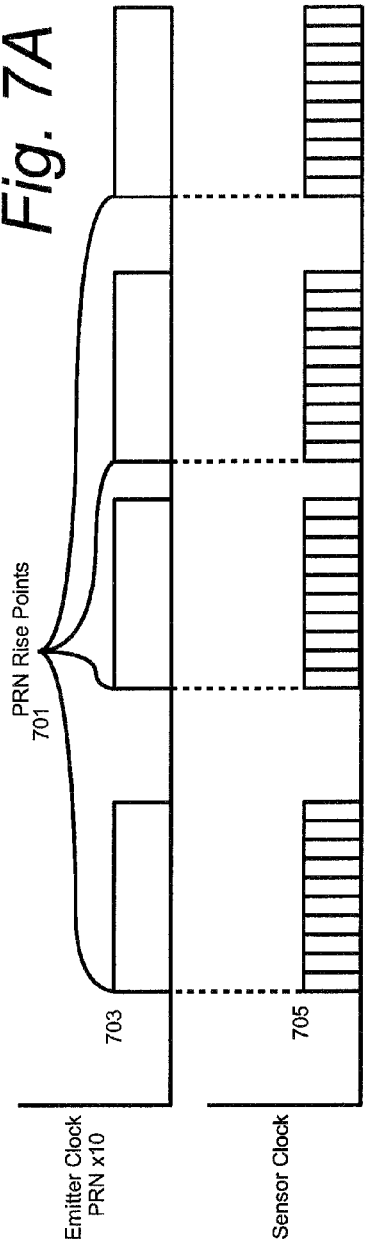
FIG. 7A shows pseudo random noise clock cycles for a tamper sensor assembly comprising an emitter and receiver.
Figure 7B:
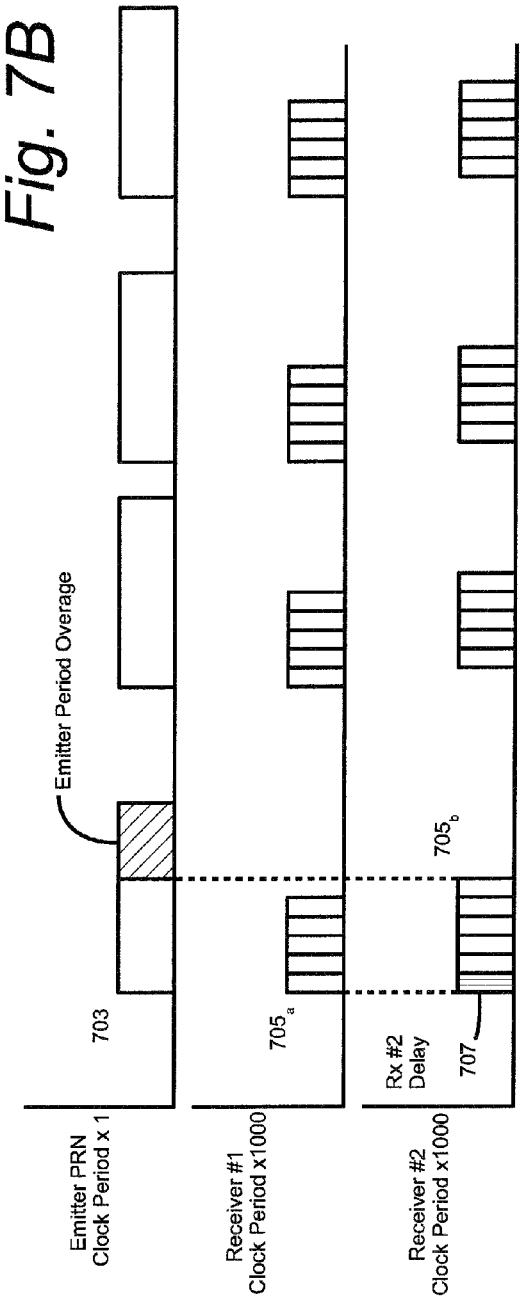
FIG. 7B shows pseudo random noise clock cycles for a tamper sensor assembly comprising an emitter and two receivers.

FIGS. 7A and 7B are diagrams illustrating exemplary PRN clock signals used for light receiver 501 and light receivers 503. FIG. 7A is a diagram showing the relationship of the emitter clock signal 703 to the receiver clock signal 705 in a single receiver embodiment of an ATAS 201. Pseudo-random noise rising edge 701 for the emitter clock signal 703 and the receiver clock signal 705 are aligned according to the pseudo random noise pattern. The receiver clock signal 705 period is smaller than the emitter clock signal 703 period by a ratio less than or equal to one.

FIG. 7B is a diagram of the relationship between the emitter clock signal 703 and the receiver clock signal $705_a$, $705_b$ in an embodiment of an ATAS 201 using two receivers. FIG. 7B shows how the two receiver clocks $705_a$, $705_b$ are managed with respect to the transmitter clock 703. The timing of the receivers $503_a$, $503_b$ may be synchronized or staggered. If staggered, the sum of the receiver clock period $705_a$, and $705_b$ is equal or less than the emitter clock 703. Receivers $503_a$, and $503_b$ are not active when the emitter 501 is off.

The rising edges 701 of the emitter clock signal 703 and the receiver clock signals $705_a$, $705_b$ are coincident but the respective fall times are not. In the embodiment of FIG. 7B, each receiver $503_a$, $503_b$ uses a clock period that is 1/1000 of the emitter clock period 703. If the two receivers $503_a$, $503_b$ were scheduled such that the second receiver $503_b$ began receiving in the same clock sub unit that first receiver $503_a$ stopped, then the total receiver clock period would be 2×1000 clock sub units=2000 sub clock units. If, on the other hand, the first and second receivers $503_a$, $503_b$ received in parallel, the total receive clock period would be 1000 clock sub units. The 1/1000 clock sub unit enables the system to measure range in centimeters as described in greater detail herein below.

Referring to FIG. 7B, the second receiver $503_b$ may start any time at or after the first sub clock of the first receiver $503_a$. As shown, receiver $503_b$ begins after delay 707. During circuit operation, a potential intruder attempting to spoof the tamper sensor will find it difficult to measure the correlation between the emitter and receiver clocks and an attempt to correlate the emitter and receivers. This level of complexity allows the circuit adequate time to detect the intrusion and erase a target memory storage, or reset an FPGA or CPLD. In addition, because a PRN pattern known to the system is used, the system is further aware of when the sensor signal is idle or not being transmitted. The receivers may be configured to monitor the time periods in which the sensor signal should not be active and detect intrusions based on the expected background signal levels. For example, if an intruder attempts to spoof the sensor receiver by providing an external sensor signal not provided according to the PRN pattern known to the ATAS, the sensor may detect the intrusion if the external sensor signal is detected at a time period when the sensor should be idle. A detected intrusion signal is generated and stored in memory. The stored detected intrusion signal is then validated by the logical component of the ATAS to determine if the detected intrusion is an actual intrusion or a false alarm.

When utilizing a digital implementation of the ATAS 201, two clock signals are required to compute intrusion target ranges. The receiver clock period to emitter clock period is in a ratio of 1000:1 as described above with regard to FIG. 7B. Considering a second clock period of $1.5 \times 10^{-9}$ seconds and the first clock period of $1.5 \times 10^{-6}$ seconds, the two clock periods correspond roughly to 1 gigahertz (GHz) and 1 Megahertz (MHz), respectively. Two counters capable of operating at those speeds allow the circuitry to measure range to the nearest centimeter. The speed of light is $3 \times 10^{10}$ centimeters per second or $1.47 \times 10^{-9}$ seconds per centimeter.

In another embodiment of an ATAS 201, an analog range solution may be used. For example, a 1 MHz digital clock may be used to provide timing to the emitter. A higher frequency wave signal may be superimposed on the 1 MHz digital clock signal for example, a 650 MHz analog waveform. Assuming the 1 MHz digital clock signal has an amplitude of 4.5 volts, the amplitude of the superimposed waveform may be chosen to be about 20% of the clock amplitude or about 1 volt peak to peak.

The receiver waveform and emitter waveform may then be mixed to create sum and difference response signals. The difference waveform may be filtered out resulting in a time shift as the emitter light beam superimposed with the analog waveform on the clock travels over the circuit board. This time shift is proportional to path length and can be used to make inferences about the range. The amplitude decreases with distance which provides an alternative means of measuring range. The period for a 650 MHz waveform is 1.5 nano seconds or about the time for light to travel one centimeter.

The receiver signal is integrated over time to establish an amplitude level proportional to the cross sectional area reflecting the signal. Signal amplitude is computed on each clock period and compared to the reflector signal amplitude established as the baseline. Any deviation is sent to the tracking filter configured to take into account any spurious momentary or random deviations.

The light emitter 501 generates light energy at levels proportional to the pulse amplitude, duration, lens shape and in an embodiment where a reflector is used, the cross sectional area of the reflector. The emitted energy also carries the modulated waveform. The reflector cross section is the surface area presented to the radiation and the efficiency of the reflection surface. Lenses are selected to shape the field intensity along the circuit board plane. By way of a non limiting example, the field intensity may be a fan shaped beam. An attempted physical intrusion causes a change in field intensity. Accordingly, the algorithm is tuned to detect a change in field intensity and not perform an absolute measurement. The reflectors 505 are passive devices and may be placed at the board edges so not to interfere with other board electronics. The reflectors are used to generate and maintain the baseline value.

Other structures such as the bottom of the adjacent board in the chassis which lie beyond the reflectors and may also contribute energy to the receiver. To account for these environmental factors for a specific use of the circuit board in the field, an initialization procedure is used. When a protected circuit board is installed in the chassis and the system is powered on, or a trusted operator re-activates the ATAS after maintenance, the ATAS establishes a new baseline received signal level range. The ATAS 201 logs a set of values over a predetermined period of time and computes a baseline received signal level range. When the baseline range is established, the ATAS arms. An intrusion algorithm collects periodic measurement values and compares them to the baseline. When the measurement values are within baseline specifications, the intrusion status is normal. If however, measured values are outside the baseline specifications, a series of statistical measurements according to a set of pre-defined rules determines if the changes in measurement values are an anomaly or an intrusion.

A change in the measurement value of sensor field intensity may be an indication of unauthorized tampering. In a case where a trusted operator needs to perform maintenance activities, the operator may disarm the sensor through software. In an implementation where the circuit board is in an open environment accessible to a trusted user, the circuit board may be equipped with a keypad or hexadecimal switch in which a trusted operator may enter a code. In the event that an operator reaches in for a moment without disarming the sensor, the system may be configured to classify such a spurious condition as an anomaly due to the short duration of the detected trigger.

Figure 8:
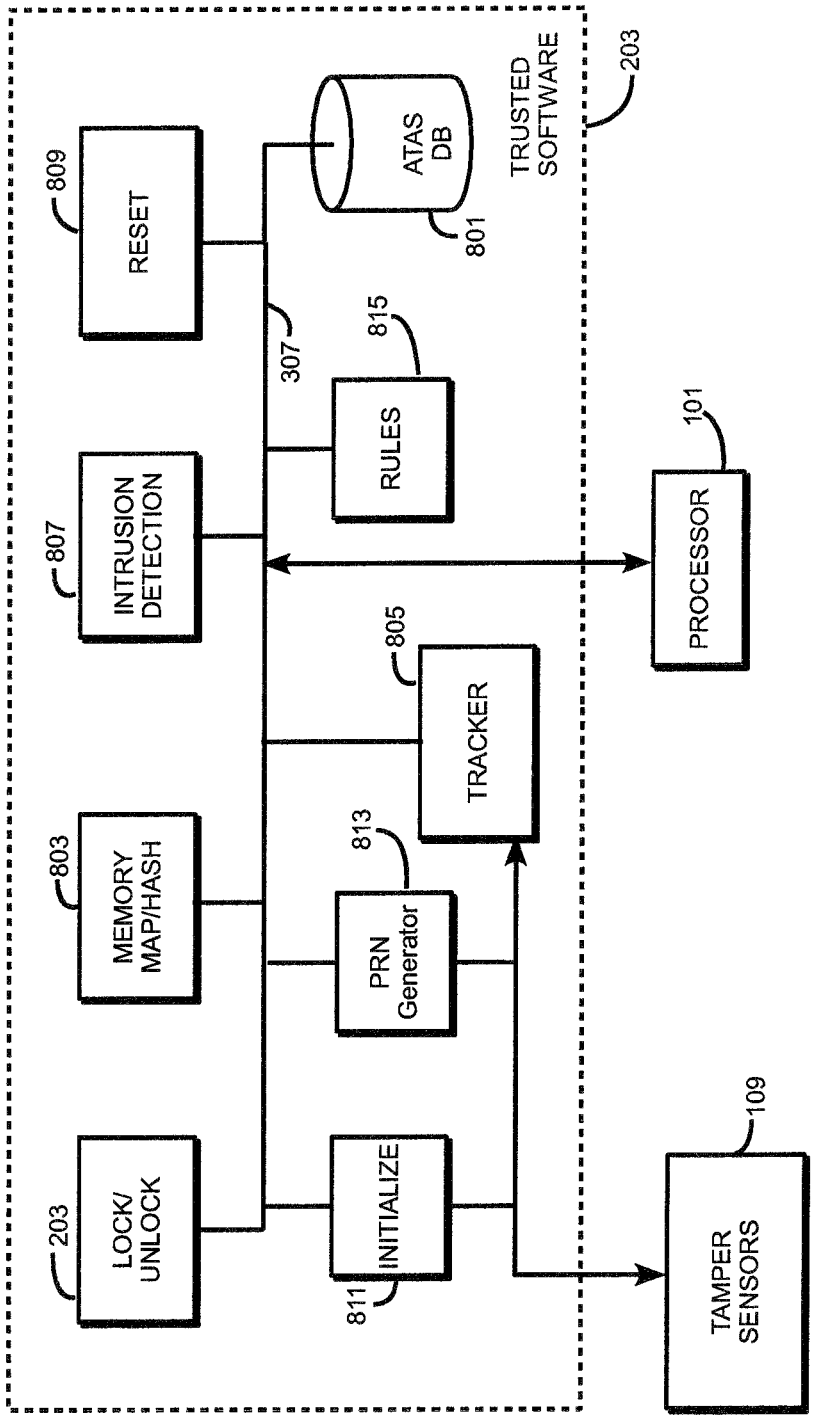
FIG. 8 is a block diagram of an anti-tamper activation system.

FIG. 8 is a block diagram of an ATAS 201. The ATAS 201 is comprised of a logical component $201_b$ embodied in trusted software 303 and a physical component $201_a$ embodied in tamper sensors 109. The logical aspect $201_b$ of the ATAS 201 utilizes a plurality of modules which may be implemented in software and executed by a processor 101. The software modules receive inputs, process data and provide outputs which may be used by other modules connected to each other through data bus 103. An initialization module 811 is coupled to the data bus 103 and the tamper sensors 109 to establish a baseline measurement level range. The initialization module 811 is configured to perform an initialization of the tamper sensor 109 for a predetermined time period and provide a baseline measurement range representative of a received signal level during normal operating conditions of the circuit board 200. When a circuit board 200 is initially powered up, or if maintenance is performed and an authorized user re-activates the ATAS 201, the tamper sensor 109 is verified and an initialization time period is triggered. During the initialization time period, light receiver 503 is configured to continuously measure a detected signal level value in the form of a signal voltage. The detected signal level value is converted to a digital signal for processing. Periodically, during the initialization time period, a tracker module 805 receives the current digital signal level value from the tamper sensor 109 and logs the digital signal value. The logged digital signal level values are used by tracker module 805 to establish a voltage range representative of the detected signal levels at the tamper sensor 109 during the initialization period. When the initialization period ends, the recorded digital signal level values are utilized to establish a baseline signal level value range against which subsequent detection signals are compared to detect an potential intrusion event.

A PRN generator 813 is coupled via data bus 103 to other modules and to tamper sensors 109. As discussed hereinabove with respect to FIGS. 7A and 7B, a PRN pattern is used to provide clock signals to the light emitter 501 and light receiver(s) 503 of the tamper sensor 109. The PRN pattern is known to the trusted software 303 and provides protection against spoofing of the light receiver 503 by a potential intruder. PRN generator provides clock signals to the tamper sensors 109 according to the known PRN pattern.

A lock and unlock module 203 is provided for activating and de-activating the ATAS 201 for required maintenance, such as software upgrades or periodic maintenance of the board or system. The lock/unlock module 203 allows an operator who is trusted by the ATAS 201 to gain access to the circuit board without triggering an intrusion event. Trusted operators are pre-determined and identifying information about each trusted user is stored within a trusted memory space on the circuit board 200. In addition, a trusted user list may be encrypted and stored in database 801. In an embodiment, the name and employee badge number may be used to identify a trusted user. The trusted user provides the identifying information to the ATAS 201 and the ATAS 201 verifies the information by reading the stored trusted user information from the trusted memory space and comparing it to the data input by the user.

The trusted user may input identifying information to the board via one or more suitable means. For example, micro switches or pushbuttons may be disposed on the circuit board 200 allowing data to be entered directly to the board's control systems. In another embodiment, a remote transmitter, for example, an infra-red (IR) transmitter may transmit encoded identification information to the circuit board 200 via a suitable IR receiver disposed on the circuit board 200. In an exemplary embodiment, the operator may have a handheld device configured to transmit the identifying information to a receiver on the circuit board 200. The trusted operator may approach the chassis containing the circuit board and hold up the handheld device which transmits the identifying information through the chassis door. For example, an IR signal may be transmitted through a transparent chassis door. Upon receiving and validating the trusted user identifying information, the software processes of the ATAS system is are stopped, disabling the intrusion detection functionality of the ATAS system. Once identified, the trusted user may access the circuit board 200 and perform changes to the system, including but not limited to tamper sensor 109 replacement, calibration, and maintenance. Additional maintenance such as software upgrades to either the operational software 309 or trusted software 303 may also be performed. Trusted users are capable of re-activating the ATAS 201 through a similar identification procedure when maintenance is complete. Upon re-activation, the initialization module 811 receives a signal to begin another initialization procedure and sets another predetermined time period to establish a new baseline measurement for future tamper sensor 109 measurement values.

Onboard memory 105 and storage are protected through a memory map/hashing module 803. The memory map/hashing module 803 is configured to compute a memory map and hash code for all memory space on the circuit board 200. The memory map associates specific memory locations with specific system functions. The associations are known to the system owner. Specific functions may include, for example, program surge, data surge, video and other functionality that affects memory usage. Trusted operations are known to the system, and when viewed in combination with the memory map established for these functions allow the system to validate memory usage during expected operation of the system. By continuously monitoring onboard memory, the system collects information about memory usage and applies validation rules to determine if incident memory usage is representative of expected operations, or whether maleficent activity is compromising the integrity of the trusted memory environment.

A hash code is calculated for both reserved (allocated) and free (unallocated) memory space. In addition, unallocated (free) memory space may be written with data based on a PRN code that enables detection of memory changes where an intruder tries to load malicious code into unallocated space. The hash code is generated based on the current state of each memory 105. The hash code is stored in a memory location known to the ATAS 201 and stored in an area such that any new request to write to memory overwrites the hash code and indicate a possible intrusion, for example, the hash code may be written at every free 64K boundary space. During operation, the ATAS 201 periodically reads and validates the stored hash code to detect any suspicious memory changes. During operation, system requests for memory allocation or de-allocation are analyzed by applying a set of validation rules to determine if the memory usage is suspicious. If the rules applied to the memory usage are indicative of suspicious activity, a validation intrusion signal may be generated and communicate the intrusion to the system. In response to the validation intrusion signal, a reset processor may operate to erase at least a portion of the onboard memory to protect intellectual property stored in the memory, or the processor may act to reset a board device, such as an FPGA or other device to a default state like that established at manufacture.

Tracker module 805 is provided to store historical data relating to periodic detected signal values from the tamper sensors 109 and other events that are capable of being logged, such as past hash code values. A historical record of measured values provides insight into changes to the values over time. For example, information regarding changes in the received signal value levels based on the frequency or duration of these changes may be used by the intrusion detection module 807 to distinguish between a true intrusion and an anomaly. By way of example, an insect flying through a system chassis may cause a spurious change to the detected signal in the tamper sensor. A set of associated validation rules for validating a detected intrusion are applied in a processor to the detected intrusion signal. Application of the validation rules identifies spurious changes to the sensor signal or the memory map/hash code as opposed to persistent changes that may indicate an actual intrusion. The tracker module 805 provides historical detected signal values before and after the spurious change, allowing the validation rules to determine that the change did not occur for a period long enough to be classified as an intrusion.

A set of detection rules 815 are established and stored in trusted software 303 that provide input to an intrusion detection algorithm 807. The intrusion detection algorithm 807 operates as a rules-based engine that uses information from the tamper sensors 109, the tracker module 805, and memory map/hashing module 803 and applies a set of intrusion rules 815 to determine if prevailing conditions indicate a true intrusion rather than an innocuous event or anomaly. For example, in a radar application, detection of a higher than usual number of targets may cause sudden increase in memory 105 utilization. A sudden change to the memory map, or a change in unused memory space may occur for a relatively short duration, and then return to normal operating conditions. Intrusion rules 815 are established to recognize such an anomaly so as not to classify the momentary detected change as an actual intrusion.

When the intrusion detection algorithm 807 determines an actual intrusion has occurred based on data reported by other modules and tamper sensors 109 as a result of applying intrusion rules 815, a reset procedure 809 may be initiated. The reset procedure 809 sends a control signal which resets or erases all or part of onboard memory and storage of circuit board 200. Additionally or alternatively, an onboard logic device such as an FPGA or CPLD may be reset such that information indicative of the logic or circuit design of the device is removed, restoring the device to a default condition and thereby protecting the intellectual property contained within the device.

A database 801 is provided for storing various information in support of the ATAS 201. For example, trusted user information may be encrypted and stored in the database 801 this information is used upon a power up of the circuit board to provide initialization information to boot up the ATAS system. In addition, logs and a historical record of hash codes may be stored in database 801. Upon a restart of the ATAS, this historical information provides context for a set of validation rules to provide validation of detected intrusion signals generated in response to a physical intrusion condition detected by a tamper sensor or a suspicious change in memory usage. These example of stored information are provided merely by way of example and other information relating to the ongoing operation of the ATAS may also be stored in database 801. Upon detection of a board shutdown, the ATAS may be configured to store current state variables to database 801. Database 801 is encrypted and stored in non-volatile memory 106 (i.e. memory that is not reset at removal of power) and may be later used during power on self test (POST) procedures to validate the state of the circuit board at startup and initialize the ATAS.

Figure 9:
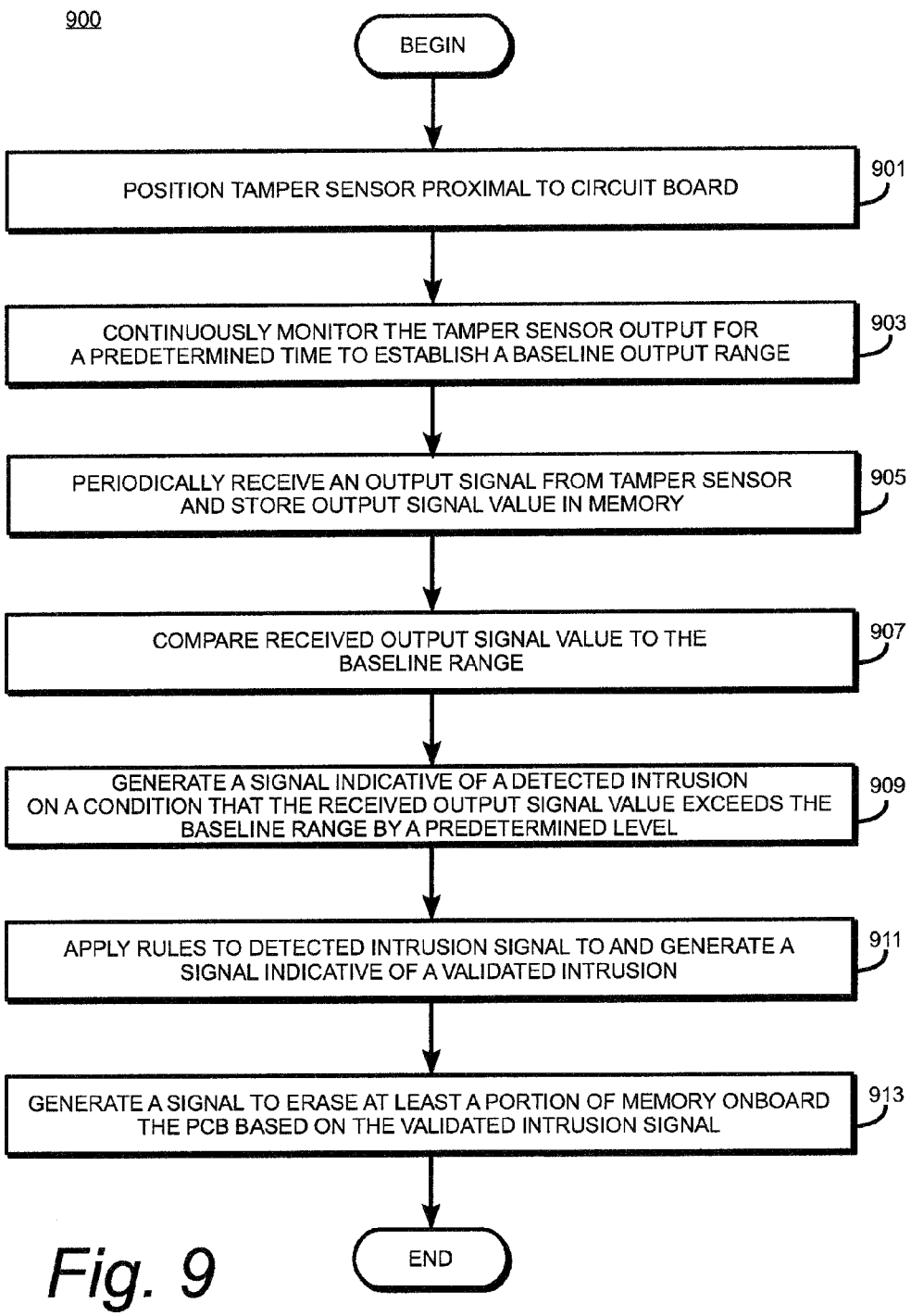
FIG. 9 is an exemplary process flow for protecting a circuit board from tampering.

FIG. 9 is a process flow diagram showing a method of protecting a circuit board from tampering using an ATAS. At least one tamper sensor is positioned proximal the circuit board (block 901). The tamper sensor will have a field of view in which the sensor monitors for an intrusion. For example, the tamper sensor may be attached to an outer edge of the circuit board and electrically connected through suitable wiring and connectors. Alternatively, tamper sensor may be disposed directly on the circuit board substrate in a manner similar to the other circuit board devices. The tamper sensor comprises a signal emitter and at least one signal receiver. The signal may be, for example, an infra-red light signal or a radio frequency (RF) electromagnetic signal. The signal is transmitted over a region proximal to the circuit board and is focused to be transmitted in a plane over the surface of the circuit board The tamper sensor receiver outputs a signal that is indicative of a detected intrusion. A predetermined initialization period is established and the output signal from the tamper sensor is continuously monitored to establish a baseline output range (block 903). The baseline output range contains threshold parameter data corresponding to the sensor output associated with the sensor during normal operating conditions when no intrusion is occurring. After the initialization period has elapsed, an output signal from the sensor is received periodically and stored in memory (block 905). The received output signal is then compared to the baseline range (block 907). If the value of the received output signal exceeds the threshold parameter data by a predetermined level, an intrusion detection signal is generated by the system. (block 909). A set of validation rules are applied to a detected intrusion signal and the stored sensor output signals to perform a validation of the detected intrusion signal. If the detected intrusion is validated, a validated intrusion signal is generated by the system (block 911). In response to the validated intrusion signal, a reset signal is generated that is operative to cause a processor to erase at least a portion of the memory onboard the circuit board (block 913). The erased memory may contain valuable intellectual property for which protection is desired. In addition, the reset signal may be operative to reset an onboard device such as an FPGA, restoring the device to a default state of manufacture.

Figure 10:
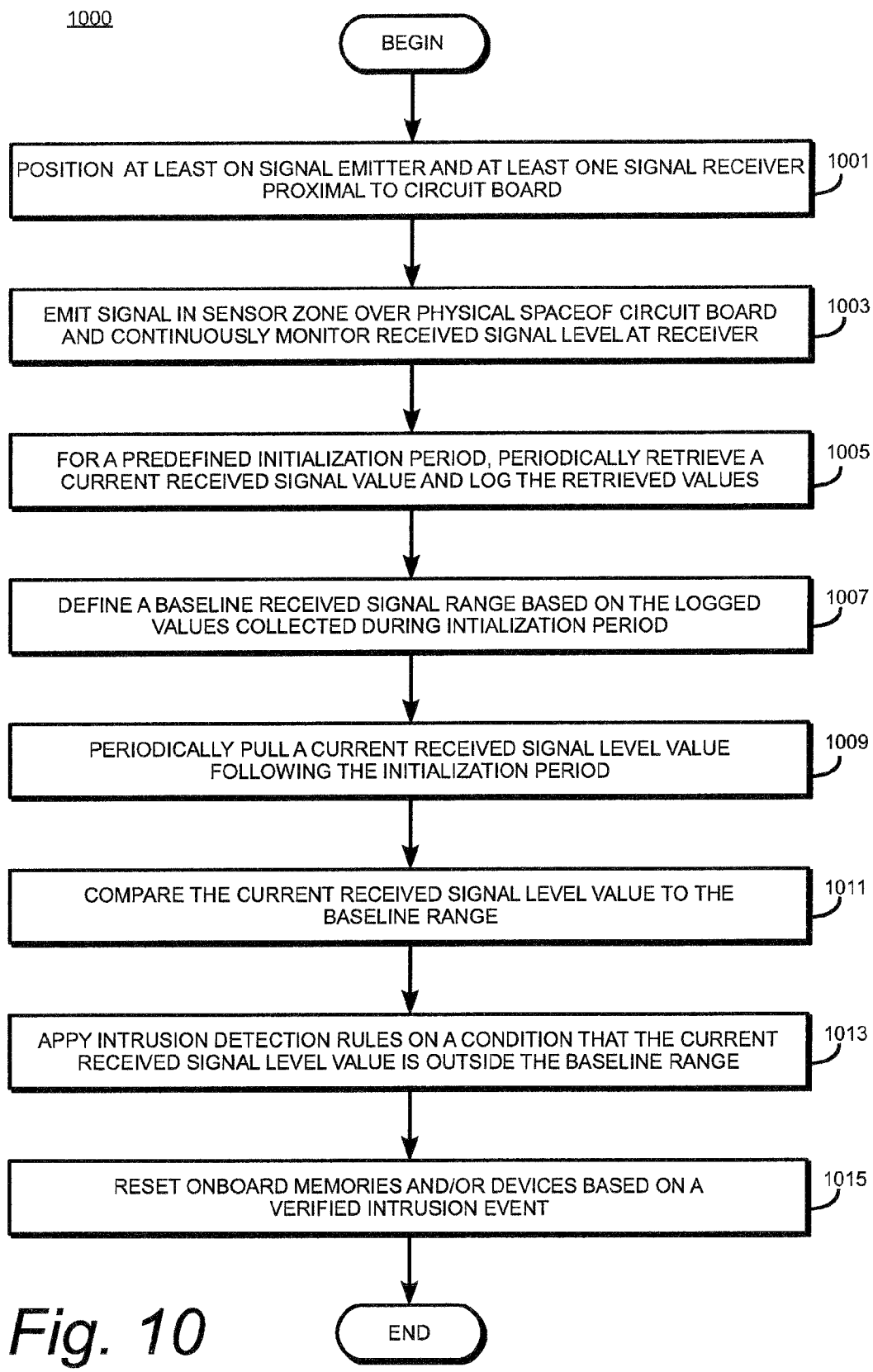
FIG. 10 an exemplary process flow for protecting a circuit board from tampering.

FIG. 10 is a flow diagram of a method for protecting the physical space above a circuit board according to an anti-tamper activation system. At least one signal emitter and at least one signal receiver are coupled to the circuit board to be protected (block 1001). The at least one signal emitter and receiver may be attached to an outer edge of the circuit board, electrically connected through suitable wiring and connectors. Alternatively, the emitter/receiver may be disposed directly on the circuit board substrate in a manner similar to the other circuit board devices. The signal may be, for example, an infra-red light signal or a radio frequency (RF) electromagnetic signal. The signal is configured to be detectable in the space above the circuit board and is substantially limited to the planar region substantially parallel to the circuit board substrate located above the circuit board within the vertical space defined by the perimeter of the circuit board. The at least one signal receiver continuously monitors the signal level and may be configured to convert the monitored signal levels to a digital format for processing.

A predetermined initialization period is defined in which the signal emitter transmits a signal detectable by the signal receivers. The emitted signal is continuously received by the at least one signal receiver (block 1003). During the initialization period, received signal level values from the signal receiver are retrieved on a periodic basis and stored in a log (block 1005). The logged values are used to establish a baseline received signal level range (block 1007).

After the initialization period elapses, periodic received signal level values from the signal receiver are requested (block 1009) and the received signal level values are compared to the established baseline received signal range (block 1011). The baseline range defines a range of values which may be considered to be normal operating parameters during a time when no tampering is occurring. If the signal received by the signal receiver deviates from the baseline range, it is classified as an intrusion event.

When an intrusion event is detected, the data relating to the event is submitted to a rules-based intrusion detection algorithm (block 1013) to verify if the event is indicative of an actual intrusion attempt as opposed to an anomaly. If the intrusion detection algorithm identifies the event as an true intrusion, a reset signal is sent to a processor to reset or erase at least of portion of onboard memory or alternatively, reset an onboard logic device (block 1015).

Figure 11:
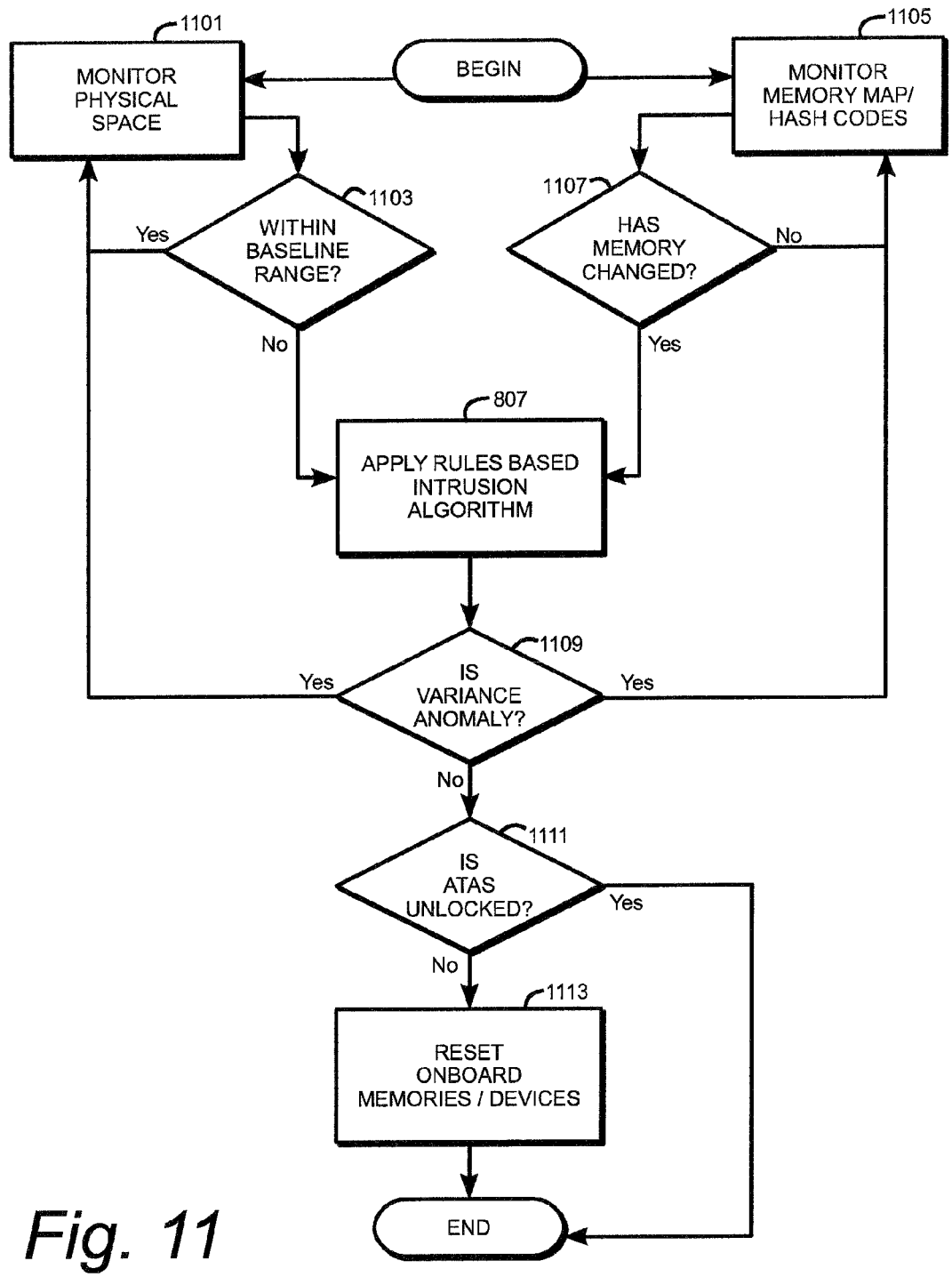
FIG. 11 is an exemplary process flow of the functions of an ATAS.

FIG. 11 is a flow diagram depicting the operation of the physical and logical aspects of an anti-tamper activation system. The operation begins by monitoring the physical space 1101 and the memory map 1103 of the circuit board being protected. Physical space above the circuit board is monitored through the use of tamper sensors. Each tamper sensor may comprise at least one signal emitter and at least one signal receiver. The signal emitter transmits a detectable signal limited to the planar region substantially parallel to the circuit board substrate and limited to the vertical space above the circuit board defined by the perimeter of the circuit board. The emitted signal is continuously monitored by the signal receiver. Periodic received signal level values are requested by the ATAS representing current received signal level values. The received signal level values are compared to a baseline range 1103 established during a predetermined initialization period that is triggered by the initial power up of the circuit board, or the re-activation of the ATAS by a trusted user. If the current signal level is within the baseline range, monitoring the physical space 1101 continues. If the current signal level value is outside the baseline range, an event is declared and data regarding the intrusion event is passed to a rules-based intrusion detection algorithm 807.

Upon initialization of the circuit board, a hash code is generated based on the current state each memory. The hash code is stored in a memory location known to the ATAS and stored in an area such that any new request to write to memory overwrites the hash code and indicates a possible intrusion. During operation, the ATAS monitors the stored hash code 1105 to detect any suspicious memory changes.

If a hash code corresponding to the current memory state does not match the stored hash code, indicating the memory has changed 1107, data relating to the change is forwarded to the rules based intrusion detection algorithm 807. If no change in memory is detected, the ATAS resumes monitoring the memory map/hash codes 1105.

The intrusion detection algorithm 807 operates as a rules-based engine that uses information from the tamper-sensors, the tracking module and the memory map/hashing module. The intrusion detection algorithm 807 applies a set of rules to determine if current conditions indicate an bona fide intrusion as opposed to some other type of anomaly. For example, in a radar application, a sudden detection of a higher than usual number of detected targets, may cause an increased use of memory. A sudden change to the memory map, or unused memory space may occur for a relatively short duration and then return to normal conditions. In such a case, rules are established to recognize such an anomaly and not classify to the change as an intrusion. If the intrusion detection algorithm 807 identifies an event as an anomaly 1109, the ATAS resumes monitoring the physical space 1101 and the memory map/hash codes 1105. If the event is not an anomaly, but rather a verified intrusion, the ATAS checks to see if the ATAS is in an unlocked, or deactivated status 1111. The ATAS may be unlocked by a trusted user to perform maintenance to either the circuit board or the ATAS. If the ATAS is unlocked, the anti-tamper process 1100 ends. If the ATAS is not unlocked, that is, in an activated state, a reset signal is sent by a processor to erase all or portions of onboard memories and storage, or reset logic devices on the circuit board 1113.

The descriptions above are presented by way of example only to provide along with the accompanying drawings, an understanding of the apparatus and methods relating to an anti-tamper activation system. These descriptions are not intended to be limiting. A person skilled in the art to which this subject matter pertains, may recognize other configurations, combinations or substitutions that may be used that still fall within the intended scope of this specification.

What is claimed is:

1. A system for protecting a circuit board from tampering, comprising:
    a sensor positioned relative to the circuit board and configured to monitor a region proximal to the circuit board for physical intrusion and output data indicative of intrusions in said region;
    a processor on said circuit board operative for comparing the sensor output data with threshold parameter data and outputting a signal indicative of a detected intrusion when the results of the comparison exceed a predetermined level;
    a validation processor on said circuit board responsive to the detected intrusion signal and operative for applying to the sensor output data a set of rules from a rules-based engine for determining the validity of the detected intrusion; and
    a reset processor responsive to a validated intrusion detection signal from said validation processor for erasing at least a portion of memory within the circuit board.

2. The system of claim 1, wherein the sensor comprises:
    a signal emitter configured to transmit a detectable signal into the region proximal to the circuit board; and
    at least one signal receiver configured to detect the signal transmitted by the signal emitter, and output data corresponding to at least one parameter associated with the received signal as output from the sensor.

3. The system of claim 2, wherein the signal emitter is an infrared (IR) emitter.

4. The system of claim 3, wherein the at least one signal receiver is an IR receiver.

5. The system of claim 2, wherein the signal emitter is configured to transmit the detectable signal according to a pseudo random noise pattern.

6. The system of claim 5, wherein the at least one signal receiver is configured to receive the detectable signal according to the pseudo random noise pattern.

7. The system of claim 1, wherein the validation processor is configured to store sensor output data indicative of physical intrusion detections, apply a set of intrusion validation rules to the stored output data, and generate a validated intrusion signal based on the application of the validation rules to the stored output data indicative of physical intrusion detections.

8. The system of claim 7, wherein the set of intrusion validation rules includes a rule based on a duration of detected intrusions.

9. The system of claim 7, wherein the set of intrusion validation rules includes a rule based on a frequency of detected intrusions.

10. The system of claim 1, further comprising an initialization processor configured to continuously monitor the output from the sensor for a predetermined initialization time period under ambient conditions to establish threshold parameter data.

11. A method of protecting a circuit board from tampering, comprising:
    monitoring a region proximal to the circuit board for physical intrusions within the region using a sensor positioned relative to the circuit board;
    comparing output data from the sensor indicative of intrusion detections within the monitored region with predetermined threshold parameter data;
    applying a set of rules from a rule-based engine to the sensor data when the comparison of the sensor output data with the threshold parameter data exceeds a predetermined level, and determining by a computer processor whether or not said output data indicating an intrusion detection represents an actual intrusion based on the application of the set of rules to the sensor output data; and
    erasing at least a portion of memory on the circuit board in response to the determination by the computer processor of an actual intrusion.

12. The method of claim 11, further comprising
    establishing the threshold parameter data based on sensor data output levels provided continuously over a predetermined initialization time period under ambient conditions.

13. The method of claim 11, further comprising generating by a processor on the circuit board an intrusion detection signal when the results from the step of comparing the output data from the sensor with the predetermined threshold parameter data exceeds a predetermined level.

14. The method of claim 13, further comprising:
    storing the output data associated with the intrusion detection signal in memory on the circuit board; and
    analyzing the stored data based on a set of validation rules to validate an intrusion detection signal as an actual intrusion.

15. The method of claim 11, further comprising:
    determining a locked/unlocked status of the circuit board upon generating a validated intrusion signal, wherein when the status is identified as locked, a reset signal is applied to the circuit board to reset memory to a default condition.

16. The method of claim 13, further comprising:
    establishing a memory map, wherein the memory map associates regions of a memory to specific functions of the circuit board;
    computing a hash code value based on a current state of select memory within the circuit board;
    storing the computed hash code value in a memory;
    periodically re-computing the hash code value based on a current state of the select memory within the circuit board;
    comparing the re-computed hash code value to the stored hash code value; and
    generating the detected intrusion signal on a condition that the re-computed hash code value does not match the stored hash code value.

17. The method of claim 16, further comprising:
    validating the detected intrusion signal based on a set of validation rules, wherein the validation rules determine an actual intrusion based on expected memory usage according to the memory map and a detected change in memory utilization; and generating a validated intrusion signal on a condition that a detected intrusion signal is validated as an actual intrusion.

18. The method of claim 11, wherein the set of validation rules validates a detected intrusion based a duration of a change in memory utilization.

19. The method of claim 11, wherein the set of validation rules validate a detected intrusion based on a duration of the detected intrusion.

20. The method of claim 11, wherein the set of validation rules validate a detected intrusion based on a frequency of a plurality of detected intrusions.

21. A non-transitory machine-readable medium on which are stored instructions, the instructions when executed by a processor cause the processor to:

establish threshold parameter data based on output signals received over a predetermined initialization time period from a sensor positioned proximal to a printed circuit board (PCB);

periodically poll the sensor and receive an output signal from the sensor;

compare the received output signal to the threshold parameter data;

generate a detected intrusion signal on a condition that the received output signal exceeds the threshold parameter data by a predetermined level;

store in memory data corresponding to the received output signal data from the sensor;

analyze the stored data based on a set of validation rules to validate a detected intrusion signal as an actual intrusion;

generate a validation intrusion signal on a condition that the detected intrusion is identified as an actual intrusion; and generate a reset signal operative to cause a processor to erase at least a portion of memory onboard the PCB responsive to the validation intrusion signal.

* * * * *